US012700416B2

(12) United States Patent
Huang et al.

(10) Patent No.: US 12,700,416 B2
(45) Date of Patent: Aug. 4, 2026

(54) AUDIO TRANSCODING METHOD AND APPARATUS COMPRISING PERFORMING ENTROPY DECODING AND ENTROPY CODING TO OBTAIN A SECOND AUDIO STREAM WITH A LOWER BITRATE

(71) Applicant: Tencent Technology (Shenzhen) Company Limited, Shenzhen (CN)

(72) Inventors: Qingbo Huang, Shenzhen (CN); Meng Wang, Shenzhen (CN); Wei Xiao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 232 days.

(21) Appl. No.: 18/046,708

(22) Filed: Oct. 14, 2022

(65) Prior Publication Data

US 2023/0075562 A1 Mar. 9, 2023

Related U.S. Application Data

(63) Continuation of application No. PCT/CN2022/076144, filed on Feb. 14, 2022.

(30) Foreign Application Priority Data

Feb. 26, 2021 (CN) ......................... 202110218868.9
Dec. 27, 2021 (CN) ......................... 202111619099.X

(51) Int. Cl.
*G10L 19/16* (2013.01)
*G10L 19/032* (2013.01)
(Continued)

(52) U.S. Cl.
CPC .......... *G10L 19/173* (2013.01); *G10L 19/032* (2013.01); *G10L 19/08* (2013.01); *G10L 19/24* (2013.01)

(58) Field of Classification Search
CPC ..... G10L 19/173; G10L 19/032; G10L 19/08; G10L 19/24
See application file for complete search history.

(56) References Cited

U.S. PATENT DOCUMENTS 8,562,098 B2 10/2013 Yasutani et al.
10,586,548 B2 * 3/2020 Baeckstroem ........ G10L 19/107
(Continued)

FOREIGN PATENT DOCUMENTS

CN 1312974 A 9/2001
CN 1669071 A 9/2005
(Continued)

OTHER PUBLICATIONS

Moriya, Takehiro, et al. "Progress in LPC-based frequency-domain audio coding." APSIPA Transactions on Signal and Information Processing 5 (2016). (Year: 2016).*
(Continued)

*Primary Examiner* — Bhavesh M Mehta
*Assistant Examiner* — Nandini Subramani
(74) *Attorney, Agent, or Firm* — Crowell & Moring LLP

(57) ABSTRACT

Provided is an audio transcoding method, including: (301) performing entropy decoding on a first audio stream with a first bitrate, to obtain an audio feature parameter and an excitation signal of the first audio stream, the excitation signal being a quantized audio signal; (302) obtaining a time-domain audio signal corresponding to the excitation signal based on the audio feature parameter and the excitation signal; (303) re-quantizing the excitation signal and the audio feature parameter based on the time-domain audio signal and a target transcoding bitrate, to obtain a target excitation signal and a target audio feature parameter; and (304) performing entropy coding on the target audio feature parameter and the target excitation signal, to obtain a second
(Continued)

audio stream with a second bitrate, the second bitrate being lower than the first bitrate.

14 Claims, 6 Drawing Sheets

(51) Int. Cl.
*G10L 19/08* (2013.01)
*G10L 19/24* (2013.01)

(56) References Cited

U.S. PATENT DOCUMENTS

| | | | | |
|---|---|---|---|---|
| 2002/0143556 | A1* | 10/2002 | Kadatch | G10L 19/032 704/500 |
| 2005/0219073 | A1* | 10/2005 | Murashima | G10L 19/173 341/51 |
| 2007/0299659 | A1* | 12/2007 | Chamberlain | G10L 19/173 704/219 |
| 2009/0125315 | A1* | 5/2009 | Koishida | G10L 19/173 704/503 |
| 2013/0054230 | A1* | 2/2013 | Thepie Fapi | H04M 3/56 704/219 |
| 2013/0227376 | A1* | 8/2013 | Hwang | H04L 1/0083 714/776 |
| 2014/0188488 | A1* | 7/2014 | Schug | G10L 19/173 704/500 |
| 2015/0106108 | A1* | 4/2015 | Baeckstroem | G10L 19/02 704/500 |
| 2016/0232908 | A1* | 8/2016 | Fuchs | G10L 19/083 |
| 2019/0108843 | A1* | 4/2019 | Atti | G10L 19/008 |

FOREIGN PATENT DOCUMENTS

| | | | |
|---|---|---|---|
| CN | 1954366 | A | 4/2007 |
| CN | 101086845 | A | 12/2007 |
| CN | 101563726 | A | 10/2009 |
| CN | 101617361 | A | 12/2009 |
| CN | 102436819 | A | 5/2012 |
| CN | 103457703 | A | 12/2013 |
| CN | 104392725 | A | 3/2015 |
| CN | 104658539 | A | 5/2015 |
| CN | 107112024 | A | 8/2017 |
| CN | 107659603 | A | 2/2018 |
| CN | 108370378 | A | 8/2018 |
| WO | WO 2011/048117 | A1 | 4/2011 |
| WO | WO 2013/185857 | A1 | 12/2013 |

OTHER PUBLICATIONS

Oger, M., et.al. ((Apr. 2007). Transform audio coding with arithmetic-coded scalar quantization and model-based bit allocation. In 2007 IEEE International Conference on Acoustics, Speech and Signal Processing—ICASSP'07 (vol. 4, pp. IV-545). IEEE (Year: 2007).*
Office Action issued on Chinese application 202111619099.X on May 7, 2024, 8 pages.
International Search Report and Written Opinion mailed May 13, 2022 for International Application No. PCT/CN2022/076144.

* cited by examiner

AUDIO TRANSCODING METHOD AND APPARATUS COMPRISING PERFORMING ENTROPY DECODING AND ENTROPY CODING TO OBTAIN A SECOND AUDIO STREAM WITH A LOWER BITRATE

RELATED APPLICATION

This application is a bypass continuation application and claims the benefit of priority to International PCT Application No. PCT/CN2022/076144 filed on Feb. 14, 2022, which is based on and claims the benefit of priority to Chinese Patent Application No. 202110218868.9, filed on Feb. 26, 2021 and entitled "AUDIO TRANSCODING METHOD AND APPARATUS, AUDIO TRANSCODER, DEVICE, AND STORAGE MEDIUM", and Chinese Patent Application No. 202111619099.X, filed on Dec. 27, 2021 and entitled "AUDIO TRANSCODING METHOD AND APPARATUS, AUDIO TRANSCODER, DEVICE, AND STORAGE MEDIUM." These prior patent applications are incorporated herein by reference in their entireties.

FIELD OF THE TECHNOLOGY

This disclosure relates to the field of audio processing, and in particular, to an audio transcoding method and apparatus, an audio transcoder, a device, and storage medium.

BACKGROUND OF THE DISCLOSURE

With the development of network technologies, more and more users conduct voice chat through social applications.

SUMMARY

Embodiments of this disclosure provide an audio transcoding method and apparatus, an audio transcoder, a device, and a storage medium, which can improve a speed and efficiency of audio transcoding. The technical solutions are as follows:

According to an aspect, an audio transcoding method is provided, including:

- performing entropy decoding on a first audio stream with a first bitrate, to obtain an audio feature parameter and an excitation signal of the first audio stream, the excitation signal being a quantized audio signal;
- obtaining a time-domain audio signal corresponding to the excitation signal based on the audio feature parameter and the excitation signal;
- re-quantizing the excitation signal and the audio feature parameter based on the time-domain audio signal and a target transcoding bitrate, to obtain a target excitation signal and a target audio feature parameter; and
- performing entropy coding on the target audio feature parameter and the target excitation signal, to obtain a second audio stream with a second bitrate, the second bitrate being lower than the first bitrate.

According to an aspect, an audio transcoder is provided, including: a first processing unit, a second processing unit, a quantization unit, and a third processing unit, the first processing unit being respectively connected to the second processing unit and the quantization unit, the second processing unit being connected to the quantization unit, the quantization unit being connected to the third processing unit;

- the first processing unit being configured to perform entropy decoding on a first audio stream with a first bitrate, to obtain an audio feature parameter and an excitation signal of the first audio stream, the excitation signal being a quantized audio signal;
- the second processing unit being configured to obtain a time-domain audio signal corresponding to the excitation signal based on the audio feature parameter and the excitation signal;
- the quantization unit being configured to re-quantize the excitation signal and the audio feature parameter based on the time-domain audio signal and a target transcoding bitrate, to obtain a target excitation signal and a target audio feature parameter; and
- the third processing unit being configured to perform entropy coding on the target audio feature parameter and the target excitation signal, to obtain a second audio stream with a second bitrate, the second bitrate being lower than the first bitrate.

According to an aspect, an audio transcoding apparatus is provided, including:

- a decoding module, configured to perform entropy decoding on a first audio stream with a first bitrate, to obtain an audio feature parameter and an excitation signal of the first audio stream, the excitation signal being a quantized audio signal;
- a time-domain audio signal obtaining module, configured to obtain a time-domain audio signal corresponding to the excitation signal based on the audio feature parameter and the excitation signal;
- a quantization module, configured to re-quantize the excitation signal and the audio feature parameter based on the time-domain audio signal and a target transcoding bitrate, to obtain a target excitation signal and a target audio feature parameter; and
- a coding module, configured to perform entropy coding on the target audio feature parameter and the target excitation signal, to obtain a second audio stream with a second bitrate, the second bitrate being lower than the first bitrate.

According to an aspect, a computer device is provided, including one or more processors and one or more memories storing at least one computer program, the computer program being loaded and executed by the one or more processors to implement the audio transcoding method.

According to an aspect, a non-transitory computer-readable storage medium is provided, storing at least one computer program, the computer program being loaded and executed by a processor to implement the audio transcoding method.

According to an aspect, a computer program product or a computer program is provided, including a program code, the program code being stored in a non-transitory computer-readable storage medium, a processor of a computer device reading the program code from the computer-readable storage medium, and the processor executing the program code, to cause the computer device to implement the foregoing audio transcoding method.

BRIEF DESCRIPTION OF THE DRAWINGS

To describe the technical solutions in the embodiments of this disclosure more clearly, the following briefly introduces the accompanying drawings required for describing the embodiments. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

Figure 1:
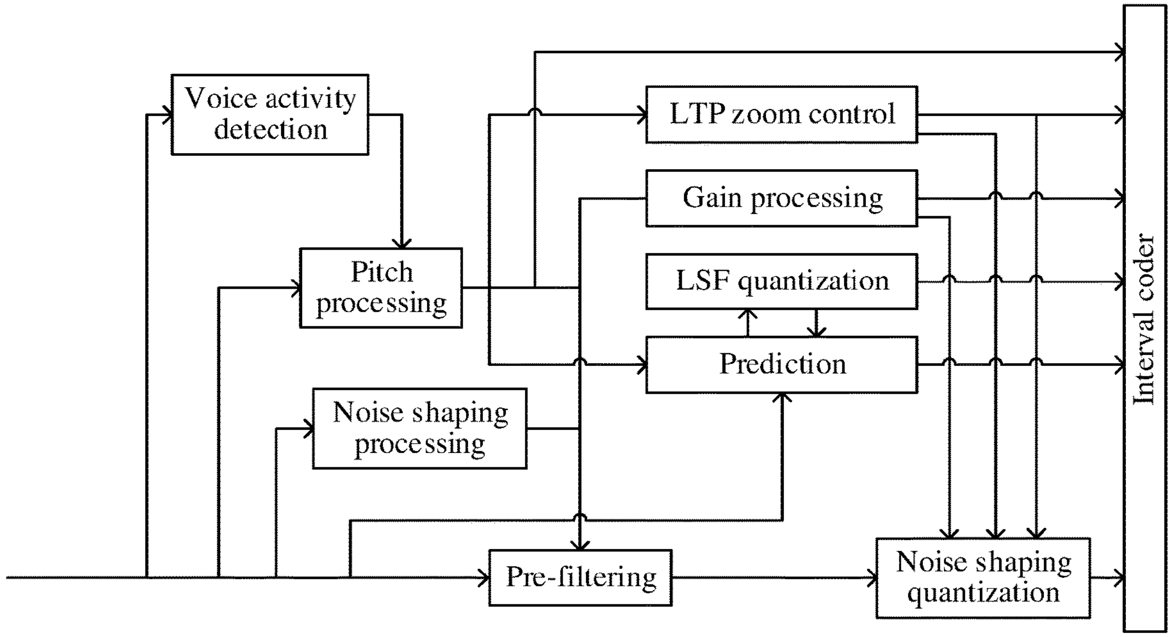
FIG. 1 is an example schematic structural diagram of a coder according to an embodiment of this disclosure.

To make the objectives, technical solutions, and advantages of this disclosure clearer, the following further describes the implementations of this disclosure in detail with reference to the accompanying drawings.

The terms "first", "second", and the like in this disclosure are used for distinguishing between same items or similar items of which effects and functions are basically the same. The "first", "second", and "nth" do not have a dependency relationship in logic or time sequence, and a quantity and an execution order thereof are not limited.

In this disclosure, the term "at least one" means one or more and "plurality of" means two or more.

In the related art, due to different network bandwidth of different users, a social application needs to transcode transmitted audio during voice chat of the users. For example, when network bandwidth of a user is relatively low, audio needs to be transcoded, that is, a bitrate of the audio is reduced, to ensure that the user can conduct voice chat normally.

However, during audio transcoding, complexity of transcoding is relatively high, resulting in slow and inefficient audio transcoding.

The cloud technology is a connection of a network technology, an information technology, an integration technology, a management platform technology, an application technology, and the like based on an application of a cloud computing business mode, and may form a resource pool, which is used on demand, and is flexible and convenient. The cloud computing technology will become an important support. A background service of a technical network system requires a large amount of computing and storage resources, such as a video website, an image website, and more portal websites.

Cloud computing is a computing mode, in which computing tasks are distributed on a resource pool formed by a large quantity of computers, so that various application systems can obtain computing power, storage space, and information services according to requirements. A network that provides resources is referred to as a "cloud". For a user, resources in a "cloud" seem to be infinitely expandable, and can be obtained readily, used on demand, expanded readily, and paid according to usage.

As a basic capability provider of cloud computing, a cloud computing resource pool (referred to as cloud platform for short, generally referred to as Infrastructure as a Service (IaaS) platform) will be established. Various types of virtual resources are deployed in the resource pool for external customers to choose and use. The cloud computing resource pool mainly includes: a computing device (a virtualized machine including an operating system), a storage device, and a network device.

Cloud conferencing is an efficient, convenient and low-cost conferencing form based on the cloud computing technology. A user can quickly, efficiently, and synchronously share voice, data files, and videos with teams and customers around the world with only simple and easy-to-use operations being performed through an Internet interface, and complex technologies such as data transmission and processing in a conference are operated by the user with the help of a cloud conference provider.

Currently, domestic cloud conferencing mainly focuses on service content with a Software as a Service (SaaS) model as a main body, and includes telephone, network, video service forms, and the like. A video conference based on the cloud computing is referred to as a cloud conference.

In the era of cloud conferencing, data transmission, processing, and storage are all dealt with by computer resources of video conferencing manufactures. A user does not need to purchase expensive hardware and install cumbersome software at all, and only needs to open a browser and log in to a corresponding interface to conduct an efficient remote conference.

A cloud conferencing system supports dynamic multi-server cluster deployment, and provides a plurality of high-performance servers, which greatly improves stability, security, and availability of a conference. In recent years, due to being capable of greatly improving communication efficiency, continuously reducing communication costs, and upgrading internal management levels, video conferencing has been welcomed by many users, and has been widely applied to various fields such as traffic, transportation, finance, operators, education, and enterprises. There is no doubt that after using the cloud computing, video conferencing becomes more attractive in terms of convenience, rapidity, and usability, which will stimulate the arrival of a new climax of application of video conferencing.

Entropy coding refers to perform coding based on an entropy principle without losing any information in a coding process, and information entropy is an average amount of information of an information source.

Quantization refers to a process of approximating a continuous value of a signal (or a large quantity of possible discrete values) to a limited quantity (or a small quantity) of discrete values.

In-band forward error correction, also referred to as forward error correction (FEC), is a method for increasing data communication credibility. In a unidirectional communication channel, when an error is found, a receiver has no right to request transmission any more. FEC is a method of using data to transmit redundant information. When an error occurs during transmission, the receiver is allowed to reconstruct data.

Audio coding is divided into two types: multi-rate coding and scalable coding. A scalable coding bit stream has the following characteristics: a bit stream with a low bitrate is a subset of a bit stream with a high bitrate; and when a network is congested, it is possible to only transmit a core bit stream with a low bitrate, which is more flexible. A multi-rate coding bit stream does not have such a characteristic. However, under the same bitrate, a decoding result of the multi-rate coding bit stream is generally better than a decoding result of the scalable coding bit stream.

OPUS is one of the most widely used audio coder. The OPUS coder is a multi-rate coder, and cannot generate a segment of cuttable bit stream like a scalable coder does. FIG. 1 is a schematic structural diagram of an OPUS coder. It can be learned from FIG. 1 that when the OPUS coder is used to code audio, the OPUS coder needs to perform steps such as voice activity detection (VAD), pitch processing, noise shaping processing, long-term prediction (LTP) zoom control, gain processing, linear spectral frequency (LSF) quantization, prediction, pre-filtering, noise shaping quantization, and interval coding. When audio transcoding needs to be performed, it is necessary to use the OPUS coder to decode the coded audio first, and then recode the decoded audio through the OPUS coder, to change a bitrate of the audio. Since coding performed by using the OPUS coder involves a relatively large number of steps, the coding complexity is relatively high.

In the embodiments of this disclosure, a computer device may be provided as a terminal or a server. The following describes an implementation environment including a terminal and a server.

Figure 2:
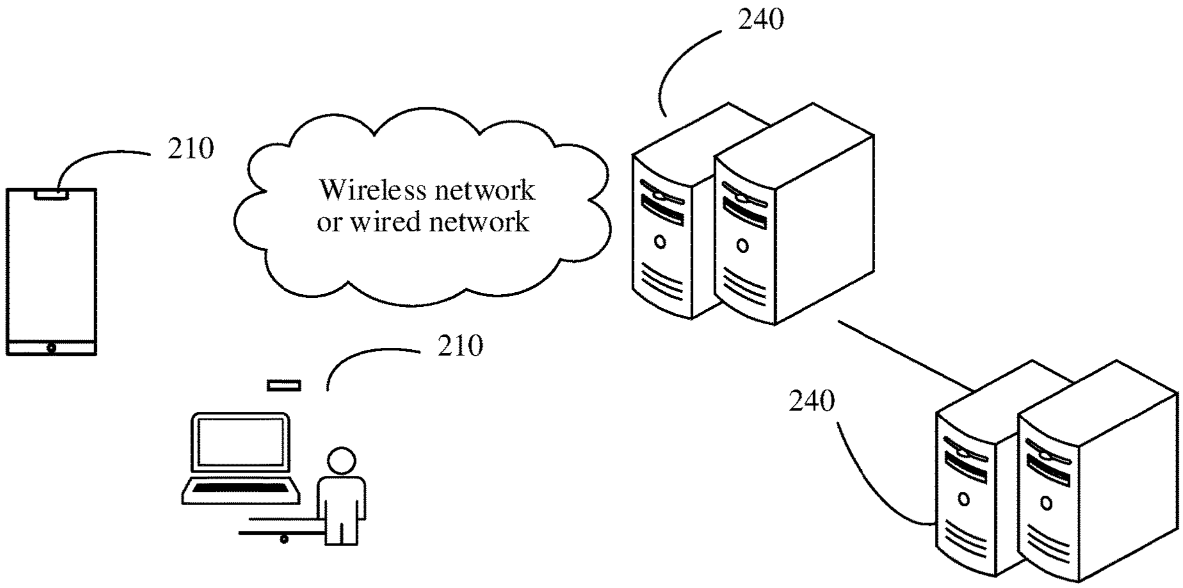
FIG. 2 is an example schematic diagram of an implementation environment of an audio transcoding method according to an embodiment of this disclosure.

FIG. 2 is a schematic diagram of an implementation environment of an audio transcoding method provided by an embodiment of this disclosure. Referring to FIG. 2, the implementation environment may include a terminal 210 and a server 240.

The terminal 210 is connected to the server 240 by using a wireless network or a wired network. Optionally, the terminal 210 is a smartphone, a tablet computer, a notebook computer, a desktop computer, a smart speaker, a smartwatch, or the like, but is not limited thereto. A social application is installed and run on the terminal 210.

Optionally, the server 240 is an independent physical server, or is a server cluster or a distributed system formed by a plurality of physical servers, or is a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. In some embodiments, the server 240 can serve as an execution body of the audio transcoding method provided in this embodiment of this disclosure. That is, the terminal 210 can collect an audio signal and transmit the audio signal to the server 240, and then the server 240 transcodes the audio signal and transmits the transcoded audio to another terminal.

Optionally, the terminal 210 generally refers to one of a plurality of terminals. In this embodiment of this disclosure, the terminal 210 is merely used as an example for description.

A person skilled in the art may learn that there may be more or fewer terminals. For example, there may be only one terminal, or there may be dozens of or hundreds of or more terminals. In this case, another terminal may be further included in the foregoing application environment. The quantity and the device type of the terminal are not limited in this embodiment of this disclosure.

All the foregoing optional technical solutions may be arbitrarily combined to form an optional embodiment of this disclosure, and details are not described herein again.

After the implementation environment of this embodiment of this disclosure is described, an application scenario of this embodiment of this disclosure is described below with reference to the foregoing implementation environment. In the following description process, the terminal is the terminal 210 in the foregoing implementation environment, the server is the server 240 in the foregoing implementation environment. This embodiment of this disclosure can be applied to various types of social applications, such as an online conferencing application, an instant messaging application, or a live streaming application, and this is not limited in this embodiment of this disclosure.

A plurality of terminals usually exist in an online conferencing application, and online conferencing application programs are installed on the plurality of terminals. A user of each terminal is a participant of an online conference. The plurality of terminals are connected to the server through a network. During an online conference, the server can transcode audio signals uploaded by each terminal, and transmits the transcoded audio signals to the plurality of terminals, so that the plurality of terminals can play the audio signals, thereby implementing the online conference. Since network environments of the plurality of terminals may be different, in a process in which the audio signals are transcoded by the server, the server can use the technical solutions provided in the embodiments of this disclosure to convert the audio signals into audio signals of different bitrates according to network bandwidth of different terminals, and transmit the audio signals of different bitrates to different terminals, thereby ensuring that all the different terminals can normally conduct the online conference. That is, for a terminal with relatively large network bandwidth, the server can transcode an audio signal at a relatively high bitrate, and a relatively high bitrate means higher voice quality. In this case, relatively large bandwidth can be fully used to improve quality of the online conference. For a terminal with relatively small network bandwidth, the server can transcode an audio signal at a relatively low bitrate, and a relatively low bitrate means relatively small bandwidth occupation. In this way, the audio signal can be transmitted to the terminal in real time, thereby ensuring normal access of the terminal to an online conference. In addition, due to network fluctuation in a network, that is, for the same terminal, network bandwidth in which the terminal is located may be relatively large at a certain moment, and may be relatively small in another moment. In this case, the server can also adjust a transcoding bitrate according to a fluctuation condition of the network over time, to ensure that the online conference is normally conducted. In some embodiments, the online conferencing may also be referred to as the cloud referencing.

For an instant messaging application, a user can conduct voice chat by installing the instant messaging application on the terminal. An example in which two users conduct voice chat through an instant messaging application is used. The instant messaging application can obtain, through terminals of the two users, audio signals during chat of the two users, and transmit the audio signals to the server. The server transmits the audio signals to the two terminals respectively. The instant messaging application plays the audio signals through the terminals, which enables the voice chat between the two users to be implemented. Similar to an online conferencing scenario, network environments of two parties that conduct voice chat may also be different, that is, one party has relatively large network bandwidth, and the other party has relatively small network bandwidth. In this case, by using the technical solutions provided in the embodiments of this disclosure, the server can transcode the audio signals, and then transmit the audio signals to the two terminals after converting the audio signals into signals of appropriate bitrates, thereby ensuring that the two users can normally conduct voice chat.

In a live streaming application, an anchor terminal used by an anchor can collect a live streaming audio signal of the anchor, and transmit the live streaming audio signal to a live streaming server. The live streaming server then transmits the live streaming audio signal to audience terminals used by different audiences. After receiving the live streaming audio signal, the audience terminals play the live streaming audio signal, so that the audiences can hear the voice of the anchor during live streaming. Since different audience terminals may be in different network environments, by using the technical solutions provided in the embodiments of this disclosure, the server can transcode the live streaming audio signal according to the network environments in which the different audience terminals are located. That is, the server converts the live streaming audio signal into audio signals with different bitrates according to different network bandwidth of the audience terminals, and then transmits the audio signals with different bitrates to the different audience terminals, thereby ensuring that all the different audience terminals can normally and adaptively play live streaming audio. That is, for an audience terminal with relatively large network bandwidth, the server can transcode the live streaming audio signal at a relatively high bitrate, and a relatively high bitrate means relatively high voice quality. In this way, a relatively large bandwidth can be fully used to improve live streaming quality. For an audience terminal with relatively small network bandwidth, the server can transcode the live streaming audio signal at a relatively low bitrate, and a relatively low bitrate means relatively small bandwidth occupation. In this way, the live streaming audio signal can be transmitted to the audience terminal in real time, thereby ensuring that the live streaming can be normally viewed through the audience terminal. In addition, due to network fluctuation in a network, that is, for the same audience terminal, network bandwidth in which the audience terminal is located may be relatively large at a certain moment, and may be relatively small in another moment. In this case, the server can also adjust a transcoding bitrate according to a time fluctuation condition of the network bandwidth, to ensure that the live streaming is normally conducted.

In addition to the foregoing three application scenarios, the technical solutions provided in the embodiments of this disclosure may also be applied to another audio transmission scenario, for example, the technical solutions may be applied to a radio and television transmission scenario, or may be applied to a satellite communication scenario. This is not limited in the embodiments of this disclosure.

The audio transcoding method provided in this embodiment of this disclosure not only can be applied to a server as a cloud service, but also can be applied to a terminal, which performs quick transcoding on audio. The execution body is not specifically limited in this embodiment of this disclosure.

Figure 3:
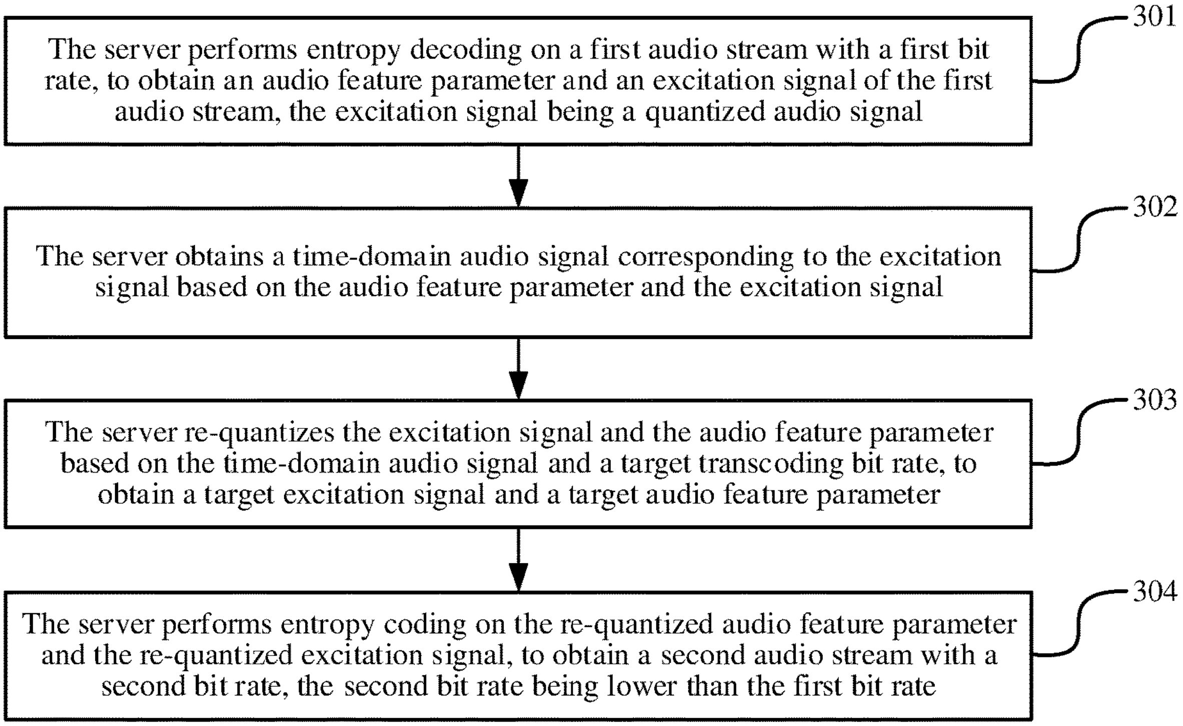
FIG. 3 is an example flowchart of an audio transcoding method according to an embodiment of this disclosure.

After the implementation environment and the application scenarios of this embodiment of this disclosure are described, the following describes the technical solutions provided in the embodiments of this disclosure. In the following description process, an example in which a body for executing the audio transcoding method is a server is used. Referring to FIG. 3, the method includes the following steps:

301. The server performs entropy decoding on a first audio stream with a first bitrate, to obtain an audio feature parameter and an excitation signal of the first audio stream, the excitation signal being a quantized audio signal.

In some embodiments, the first audio stream is an audio stream with a high bitrate, and the audio feature parameter includes signal gain, a line spectral frequency (LSF) parameter, a long-term prediction (LTP) parameter, a treble delay, and the like. Quantization refers to a process of approximating a continuous value of a signal to a limited quantity (or a small quantity) of discrete values. The audio signal is a continuous signal and the excitation signal obtained after quantization is a discrete signal, which enables the server to perform subsequent processing conveniently. In some embodiments, a high bitrate refers to a bitrate of an audio stream uploaded by a terminal to the server. In another embodiment, the high bitrate may also be a bitrate higher than a certain bitrate threshold. For example, when the bitrate threshold is 1 Mbps, a bitrate higher than 1 Mbps is also referred to as a high bitrate. Certainly, in different coding standards, definitions for the high bitrate may be different, and this is not limited in the embodiments of this disclosure. In some scenarios, the audio signal is a voice or speech signal.

302. The server obtains a time-domain audio signal corresponding to the excitation signal based on the audio feature parameter and the excitation signal.

In some embodiments, the excitation signal is a discrete signal, and the server can restore the excitation signal to the time-domain audio signal based on the audio feature parameter, to perform subsequent audio transcoding.

303. The server re-quantizes the excitation signal and the audio feature parameter based on the time-domain audio signal and the target transcoding bitrate, to obtain a target excitation signal and a target audio feature parameter.

In some embodiments, re-quantization may also be referred to as noise shaping quantization (NSQ). A re-quantization process is a compression process, and a process in which the server re-quantizes the excitation signal and the audio feature parameter is a process of re-compressing the excitation signal and the audio feature parameter.

304. The server performs entropy coding on the target audio feature parameter and the target excitation signal, to obtain a second audio stream with a second bitrate, the second bitrate being lower than the first bitrate.

After the audio feature parameter and the excitation signal are re-quantized, the audio feature parameter and the excitation signal are also compressed. By performing entropy coding on the re-quantized audio feature parameter and the excitation signal, the second audio stream with a lower bitrate can be directly obtained.

By using the technical solutions provided in the embodiments of this disclosure, when transcoding is performed on an audio stream, a complete parameter extraction process does not need to be performed, but instead, entropy decoding is performed to obtain the audio feature parameter and the excitation signal. The re-quantization is performed for the excitation signal and the audio feature parameter, and does not involve related processing on the time-domain signal. Finally, entropy coding is performed on the excitation signal and the audio feature parameter, to obtain the second audio stream with a smaller bitrate. Since a computing amount of entropy decoding and entropy coding is relatively small, the computing amount can also be greatly reduced without performing processing on the time-domain signal, thereby improving a speed and efficiency of audio transcoding as a whole on the premise of ensuring audio quality.

Figure 4:
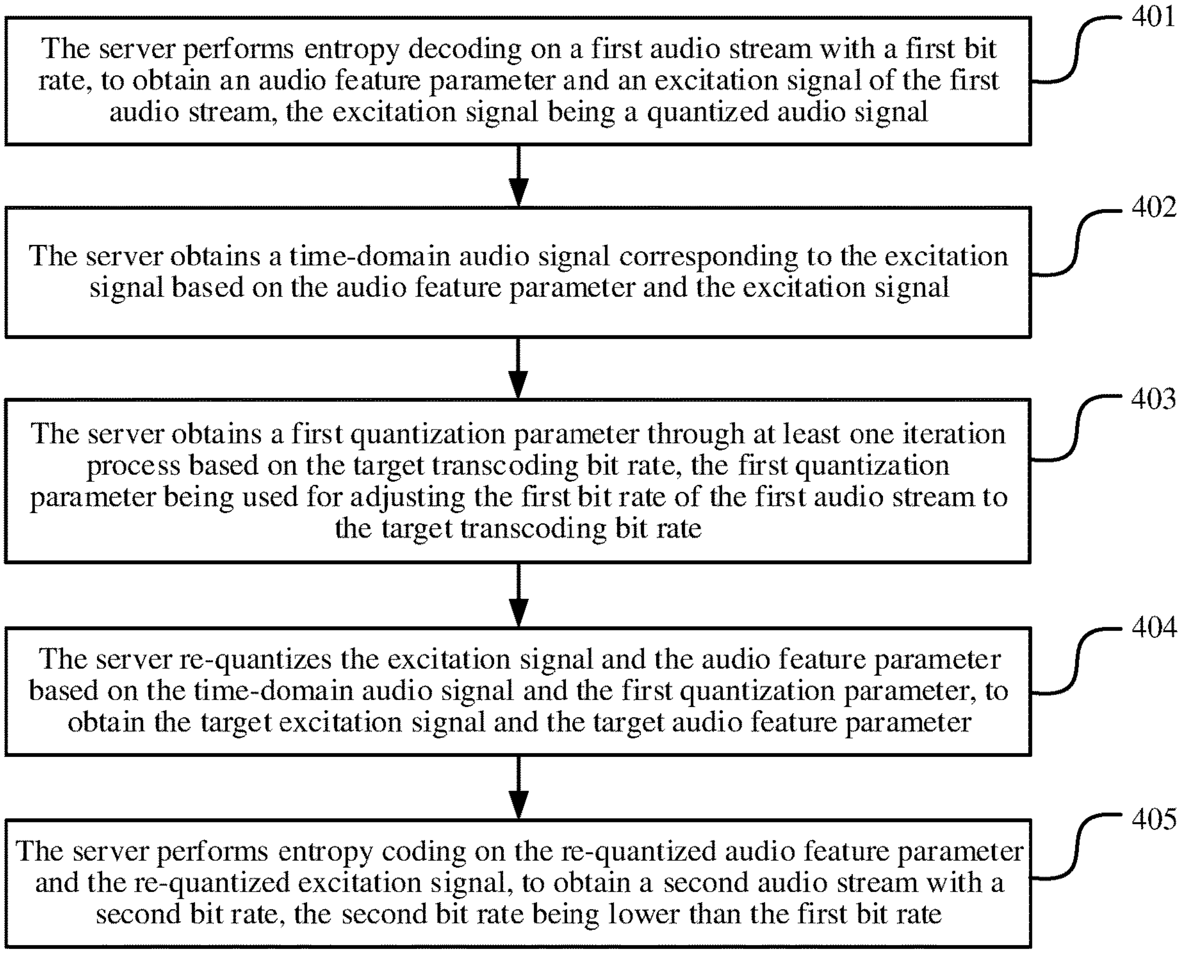
FIG. 4 is an example flowchart of an audio transcoding method according to an embodiment of this disclosure.

The foregoing steps 301 to 304 are brief descriptions of this embodiment of this disclosure. The technical solutions provided in the embodiments of this disclosure are further clearly described below with reference to some examples. Referring to FIG. 4, the method includes:

401. The server performs entropy decoding on a first audio stream with a first bitrate, to obtain an audio feature parameter and an excitation signal of the first audio stream, the excitation signal being a quantized audio signal.

In a possible implementation, the server obtains appearance probabilities of a plurality of coding units in the first audio stream. The server decodes the first audio stream based on the appearance probabilities, to obtain a plurality of decoding units respectively corresponding to the plurality of coding units. The server combines the plurality of decoding units, to obtain the audio feature parameter and the excitation signal of the first audio stream. In some embodiments, the coding unit is a smallest coding unit when coding is performed on an audio stream.

The foregoing implementation is merely an example implementation of entropy decoding. To more clearly describe the foregoing implementation, the following first describes an entropy coding method corresponding to the foregoing implementation.

For example, the server obtains the appearance probabilities of the plurality of coding units in the target audio feature parameter and the target excitation signal of the first audio stream. The server determines an initial interval corresponding to the first audio stream. The server divides the initial interval into a plurality of level-one sub-intervals based on the appearance probabilities of the plurality of coding units. The plurality of level-one sub-intervals correspond to the plurality of coding units one by one, and a ratio between interval lengths of every two level-one sub-intervals is the same as a ratio between appearance probabilities of every two coding units. For the first level-one sub-interval in the plurality of level-one sub-intervals, the server divides the level-one sub-interval into a plurality of level-two sub-intervals based on the appearance probabilities of the plurality of coding units. The plurality of level-two sub-intervals respectively correspond to combinations of the first coding unit in the plurality of coding units and any coding unit in the plurality of coding units. The server determines a target level-two sub-interval from the plurality of level-two sub-intervals based on appearance orders of the plurality of coding units in the first audio stream, and further performs division based on the target level-two sub-interval. The server repeatedly performs the foregoing steps until a level-K sub-interval is obtained. The level-K sub-interval is a sub-interval corresponding to a combination of the plurality of coding units. K is a positive integer, and is the same as a quantity of the plurality of coding units. The server can use any value in the level-K sub-interval to represent the first audio stream, and the value is also a coding value obtained by performing entropy coding on the first audio stream.

For example, to simplify the process, an example in which the first audio stream is "MNOOP" is used. Each letter in "MNOOP" is a coding unit, and "MNOOP" can represent the audio feature parameter and the excitation signal of the first audio stream. In "MNOOP", the letter "M" appears once, the letter "N" appears once, the letter "O" appears twice, and the letter "P" appears once. Since "MNOOP" includes 5 letters, appearance probabilities of "M", "N", "O", and "P" in "MNOOP" are respectively 0.2, 0.2, 0.4, and 0.2. In some embodiments, an initial interval corresponding to "MNOOP" is [0, 100000]. According to the appearance probabilities of "M", "N", "O", and "P", the server divides the interval [0, 100000] into four sub-intervals: M: [0, 20000], N: [20000, 40000], O: [40000, 80000], and P: [80000, 100000]. A ratio between lengths of every two sub-intervals is the same as a ratio between corresponding appearance probabilities. Since the first letter in "MNOOP" is "M", the server selects the first sub-interval M: [0, 20000] as a basic interval for subsequent entropy coding. According to the appearance probabilities of "M", "N", "O", and "P", the server divides the interval M: [0, 20000] into four sub-intervals: MM: [0, 4000], MN: [4000, 8000], MO: [8000, 16000], and MP: [16000, 20000]. Since the first two letters in "MNOOP" are "MN", the server selects the second sub-interval MN: [4000, 8000] as a basic interval for subsequent entropy coding. According to the appearance probabilities of "M", "N", "O", and "P", the server divides the interval MN: [4000, 8000] into four sub-intervals: MNM: [4000, 4800], MNN: [4800, 5600], MNO: [5600, 7200], and MNP: [7200, 8000]. Since the first three letters in "MNOOP" are "MNO", the server selects the third sub-interval MNO: [5600, 7200] as a basic interval for subsequent entropy coding. According to the appearance probabilities of "M", "N", "O", and "P", the server divides the interval MNO: [5600, 7200] into four sub-intervals: MNOM: [5600, 5920], MNON: [5920, 6240], MNOO: [6240, 6880], and MNOP: [6880, 7200]. Since the first four letters in "MNOOP" are "MNOO", the server selects the third sub-interval MNOO: [6240, 6880] as a basic interval for subsequent entropy coding. According to the appearance probabilities of "M", "N", "O", and "P", the server divides the interval MNOO: [6240, 6880] into four sub-intervals: MNOOM: [6240, 6368], MNOON: [6368, 6496], MNOOO: [6496, 6752], and MNOOP: [6752, 6880], and therefore it is obtained that an interval for performing entropy coding on "MNOOP" is [6752, 6880]. The server can use any value in the interval [6752, 6880] to represent a coding result of "MNOOP", for example, 6800 is used for representing "MNOOP". In the foregoing implementation, 6800 is also the first audio stream.

The foregoing implementation is described on the basis of the foregoing entropy coding.

For example, the server obtains the appearance probabilities of the plurality of coding units in the first audio stream. The server determines the initial interval corresponding to the first audio stream. The initial interval is the same as that in the entropy coding process. The server divides the initial interval into a plurality of level-one sub-intervals based on the appearance probabilities of the plurality of coding units. The plurality of level-one sub-intervals correspond to the plurality of coding units one by one, and a ratio between interval lengths of every two level-one sub-intervals is the same as a ratio between appearance probabilities of every two coding units. The server compares the coding value of the first audio stream with the plurality of level-one sub-intervals, and determines a level-one sub-interval to which the coding value belongs as a target level-one sub-interval. A coding unit corresponding to the target level-one sub-interval is the first coding unit corresponding to the first audio stream. The server divides the target level-one sub-interval into a plurality of level-two sub-intervals based on the appearance probabilities of the plurality of coding units.

The server determines a target level-two sub-interval from the plurality of level-two sub-intervals based on the coding value of the first audio stream. Two coding units corresponding to the target level-two sub-interval are the first two coding units corresponding to the first audio stream. The server performs subsequent decoding based on the target level-two sub-interval until a target level-K sub-interval is obtained. K coding units corresponding to the target level-K sub-interval are all coding units corresponding to the first audio stream. K is a positive integer, and is the same as the quantity of the plurality of coding units.

For example, descriptions are made by using an example in which the first audio stream is 6800. The server obtains the appearance probabilities of the plurality of coding units in the first audio stream, that is, the appearance probabilities of "M", "N", "O", and "P" are respectively 0.2, 0.2, 0.4, and 0.2. The server constructs an initial interval [0, 100000] that is the same as that in the entropy coding process. According to the appearance probabilities of "M", "N", "O", and "P", the server divides the interval [0, 100000] into four sub-intervals: M: [0, 20000], N: [20000, 40000], O: [40000, 80000], and P: [80000, 100000]. Since the first audio stream 6800 is in the first sub-interval M: [0, 20000], the server uses the interval [0, 20000] as a basic interval for subsequent entropy decoding, and uses M as the first decoding unit obtained through decoding. According to the appearance probabilities of "M", "N", "O", and "P", the server divides the interval M: [0, 20000] into four sub-intervals: MM: [0, 4000], MN: [4000, 8000], MO: [8000, 16000], and MP: [16000, 20000]. Since the first audio stream 6800 is in the second sub-interval MN: [4000, 8000], the server uses the sub-interval [4000, 8000] as a basic interval for subsequent entropy decoding, and uses N as the second decoding unit obtained through decoding. According to the appearance probabilities of "M", "N", "O", and "P", the server divides the interval MN: [4000, 8000] into four sub-intervals: MNM: [4000, 4800], MNN: [4800, 5600], MNO: [5600, 7200], and MNP: [7200, 8000]. Since the first audio stream 6800 is in the third sub-interval MNO: [5600, 7200], the server uses the sub-interval [5600, 7200] as a basic interval for subsequent entropy decoding, and uses 0 as the third decoding unit obtained through decoding. According to the appearance probabilities of "M", "N", "O", and "P", the server divides the interval MNO: [5600, 7200] into four sub-intervals: MNOM: [5600, 5920], MNON: [5920, 6240], MNOO: [6240, 6880], and MNOP: [6880, 7200]. Since the first audio stream 6800 is in the third sub-interval MNOO: [6240, 6880], the server uses the sub-interval [6240, 6880] as a basic interval for subsequent entropy decoding, and uses 0 as the fourth decoding unit obtained through decoding. According to the appearance probabilities of "M", "N", "O", and "P", the server divides the interval MNOO: [6240, 6880] into four sub-intervals: MNOOM: [6240, 6368], MNOON: [6368, 6496], MNOOO: [6496, 6752], and MNOOP: [6752, 6880]. Since the first audio stream 6800 is in the fourth sub-interval MNOOP: [6752, 6880], the server uses P as the fifth decoding unit obtained through decoding. The server combines the decoded five decoding units "M", "N", "0", "0", and "P", to obtain "MNOOP", that is, the audio feature parameter and the excitation signal of the first audio stream.

To more clearly describes the technical solutions provided in the embodiments of this disclosure, the following describes the foregoing implementation on the basis of the entropy decoding in the foregoing examples.

Figure 5:
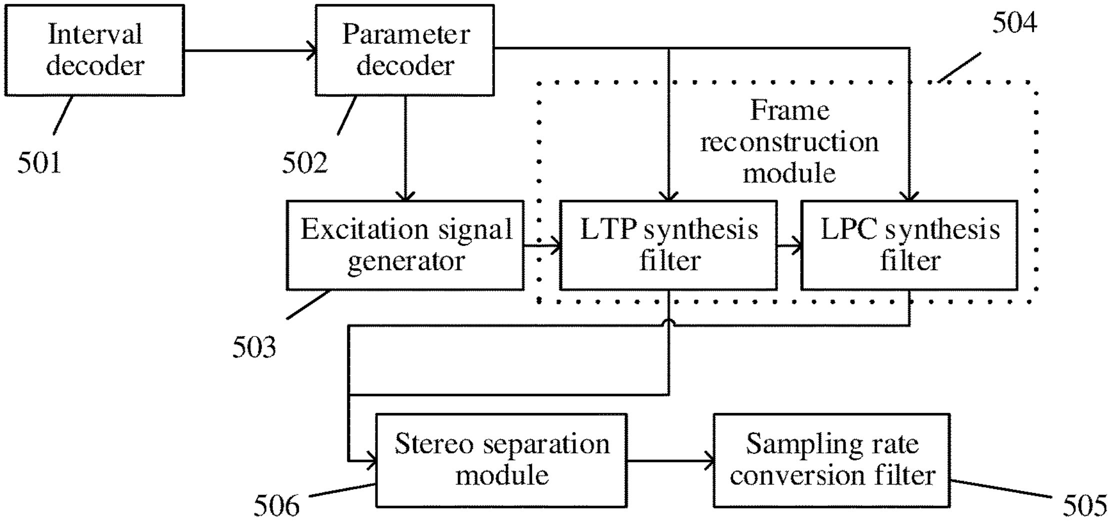
FIG. 5 is an example schematic structural diagram of a decoder according to an embodiment of this disclosure.

Referring to FIG. 5, in a possible implementation, the server inputs the first audio stream into an interval decoder 501, to perform entropy decoding on the first audio stream. For the process of entropy decoding, reference is made to the foregoing examples, and details are not described herein again. After entropy decoding is performed by the interval decoder 501 on the first audio stream, an audio stream on which entropy decoding has been performed is obtained. The server inputs the audio stream on which entropy decoding has been performed into a parameter decoder 502, to output a flag bit pulse, signal gain, and the audio feature parameter through the parameter decoder 502. The server inputs the flag bit pulse and the signal gain into an excitation signal generator 503, to obtain the excitation signal.

402. The server obtains a time-domain audio signal corresponding to the excitation signal based on the audio feature parameter and the excitation signal.

In a possible implementation, the server processes the excitation signal based on the audio feature parameter, to obtain the time-domain audio signal corresponding to the excitation signal.

For example, referring to FIG. 5, the server inputs the audio feature parameter and the excitation signal into a frame reconstruction module 504, and the frame reconstruction module 504 outputs an audio signal on which frame reconstruction has been performed. The server inputs the audio signal on which frame reconstruction has been performed into a sampling rate conversion filter 505, and performs resampling and coding through the sampling rate conversion filter 505, to obtain the time-domain audio signal corresponding to the excitation signal. Optionally, when the audio signal on which frame reconstruction has been performed is a stereo audio signal, before the audio signal on which frame reconstruction has been performed is inputted into the sampling rate conversion filter, the server can input the audio signal on which frame reconstruction has been performed into a stereo separation module 506, and divide the audio signal on which frame reconstruction has been performed into a mono audio signal. The server inputs the mono audio signal into the sampling rate conversion filter 505 for resampling and coding, to obtain the time-domain audio signal corresponding to the excitation signal.

A method in which the frame reconstruction module performs frame reconstruction on the excitation signal is described below.

In a possible implementation, the audio feature parameter includes signal gain, a line spectral frequency (LSF) coefficient, a long-term prediction (LTP) coefficient, a treble delay, and the like. The frame reconstruction module includes an LTP synthesis filter and a linear predictive coding (LPC) synthesis filter. The server inputs the excitation signal, and the treble delay and the LTP coefficient in the audio feature parameter into the LTP synthesis filter, and the LTP synthesis filter performs first frame reconstruction on the excitation signal, to obtain a first filtered audio signal. The server inputs the first filtered audio signal, the LSF coefficient, and the signal gain into the LPC synthesis filter, and the LPC synthesis filter performs second frame reconstruction on the first filtered audio signal, to obtain a second filtered audio signal. The server fuses the first filtered audio signal and the second filtered audio signal, to obtain the audio signal on which frame reconstruction has been performed.

403. The server obtains a first quantization parameter through at least one iteration process based on the target transcoding bitrate, the first quantization parameter being used for adjusting the first bitrate of the first audio stream to the target transcoding bitrate.

In a possible implementation, the server obtains the first quantization parameter through the at least one iteration process. In any iteration process, the server determines a first candidate quantization parameter based on the target transcoding bitrate. The server simulates a re-quantization process of the excitation signal and the audio feature parameter based on the first candidate quantization parameter, to obtain a first signal corresponding to the excitation signal and a first parameter corresponding to the audio feature parameter. The server simulates an entropy coding process of the first signal and the first parameter, to obtain an analog audio stream. The first candidate quantization parameter is determined as the first quantization parameter in response to the analog audio stream meeting a first target condition and at least one of the time-domain audio signal and the first signal, the target transcoding bitrate and a bitrate of the analog audio stream, or a quantity of completed iterations meeting a second target condition.

A processing process including four parts is included in the foregoing implementation. That is, the server first determines a candidate quantization parameter, and then re-quantizes the excitation signal and the audio feature parameter according to the candidate quantization parameter, to obtain the first signal and the first parameter. The server can simulate the entropy coding process of the first signal and the first parameter, to obtain the analog audio stream. The server discriminates the analog audio stream, to determine whether the analog audio stream meets a requirement. Discrimination on the requirement is performed based on the first target condition and the second target condition. When both the first target condition and the second target condition are satisfied, the server can end the iteration and output the first quantization parameter. When either of the first target condition and the second target condition is not satisfied, the server can perform iteration again.

To more clearly describes the foregoing implementation, the following describes the foregoing implementation in four parts.

Part 1: The server determines the first candidate quantization parameter based on the target transcoding bitrate.

The target transcoding bitrate can be determined by the server according to an actual condition. For example, the target transcoding bitrate is determined according to network bandwidth, so that the target transcoding bitrate matches the network bandwidth.

In some embodiments, the first candidate quantization parameter represents a quantization step size. The longer the quantization step size is, the larger a compression ratio is, and the less an amount of quantized data is. The shorter the quantization step size is, the smaller the compression ratio is, and the greater the amount of the quantized data is. In some embodiments, the target transcoding bitrate is less than the first bitrate of the first audio stream. In this case, in an audio transcoding process, that is, in a process of reducing a bitrate of an audio stream, the server can generate a first candidate quantization parameter based on the target transcoding bitrate. After the excitation signal and the audio feature parameter are re-quantized by using the first candidate quantization parameter, an audio stream with a lower bitrate can be obtained, and a bitrate of the audio stream is close to the target transcoding bitrate.

Part 2: The server simulates the re-quantization process of the excitation signal and the audio feature parameter based on the first candidate quantization parameter, to obtain the first signal corresponding to the excitation signal and the first parameter corresponding to the audio feature parameter.

The foregoing simulation means that the server does not re-quantize the excitation signal and the audio feature parameter, but simulates the re-quantization process based on the first candidate quantization parameter, to subsequently determine the first quantization parameter used in an actual quantization process. Through this simulation process, the server can determine a most suitable first quantization parameter.

In a possible implementation, the server respectively simulates a discrete cosine transform process of the excitation signal and a discrete cosine transform process of the audio feature parameter, to obtain a second signal corresponding to the excitation signal and a second parameter corresponding to the audio feature parameter. The server performs rounding after respectively dividing the second signal and the second parameter by the first candidate quantization parameter, to obtain the first signal and the first parameter.

Descriptions are made by using an example in which the server re-quantizes the excitation signal. In the simulation process, the server performs discrete cosine transform on the excitation signal, to obtain the second signal. The server re-quantizes the second signal by using the quantization step size corresponding to the first candidate quantization parameter, that is, the server performs rounding after dividing the second signal by the quantization step size represented by the first candidate parameter, to obtain the first signal.

For example, when the excitation signal is a matrix $$\begin{pmatrix} 15 & 20 & 25 & 25 \\ 25 & 20 & 10 & 10 \\ 30 & 25 & 5 & 15 \\ 25 & 35 & 20 & 15 \end{pmatrix},$$

the server can perform discrete cosine transform on the excitation signal $$\begin{pmatrix} 15 & 20 & 25 & 25 \\ 25 & 20 & 10 & 10 \\ 30 & 25 & 5 & 15 \\ 25 & 35 & 20 & 15 \end{pmatrix}.$$

That is, the server performs discrete cosine transform on the excitation signal $$\begin{pmatrix} 15 & 20 & 25 & 25 \\ 25 & 20 & 10 & 10 \\ 30 & 25 & 5 & 15 \\ 25 & 35 & 20 & 15 \end{pmatrix}$$

through the following formula (1), to obtain the second signal.

$$F(u) = c(u)\sum_{i=0}^{N-1} f(i)\cos\left[\frac{(i+0.5)\pi}{N}u\right] \tag{1}$$

-continued $$c(u)=\begin{cases}\sqrt{\frac{1}{N}}, & u=0\\ \sqrt{\frac{2}{N}}, & u\neq 0\end{cases}$$

F(u) is the second signal, u is a generalized frequency variable, u=1, 2, 3 . . . N−1, f(i) is the excitation signal, N is a quantity of values in the excitation signal, and i is a value in the excitation signal.

For ease of description, an example in which the second signal is $$\begin{pmatrix}195 & -1 & -12 & -5\\ -25 & -20 & -6 & -3\\ -11 & 9 & -2 & 2\\ -7 & -2 & 0 & 2\end{pmatrix}$$

and the quantization step size is 28 is used below for description. In some embodiments, the server can re-quantize the second signal through the following formula (2), to obtain the first signal.

$$Q(m)=\mathrm{round}(m/S+0.5) \tag{2}$$

Q( ) is a quantization function, m is a value in the second signal, round( ) is a rounding function for rounding up, and S is a quantization step size.

Taking 195 in the second signal $$\begin{pmatrix}195 & -1 & -12 & -5\\ -25 & -20 & -6 & -3\\ -11 & 9 & -2 & 2\\ -7 & -2 & 0 & 2\end{pmatrix}$$

as an example, the server can substitute 195 into the formula (2), that is, Q(195)=round(195/28+0.5)=round(7.464)=7, and 7 is a result obtained by quantizing 195. After the server re-quantizes the second signal $$\begin{pmatrix}195 & -1 & -12 & -5\\ -25 & -20 & -6 & -3\\ -11 & 9 & -2 & 2\\ -7 & -2 & 0 & 2\end{pmatrix}$$

by using the formula (2), the first signal $$\begin{pmatrix}7 & 0 & 0 & 0\\ -1 & -1 & 0 & 0\\ 0 & 0 & 0 & 0\\ 0 & 0 & 0 & 0\end{pmatrix}$$

can be obtained.

Part 3: The server simulates the entropy coding process of the first signal and the first parameter, to obtain the analog audio stream.

An example in which entropy coding performed on the first signal $$\begin{pmatrix}7 & 0 & 0 & 0\\ -1 & -1 & 0 & 0\\ 0 & 0 & 0 & 0\\ 0 & 0 & 0 & 0\end{pmatrix}$$

is simulated is used for description. The server can divide the first signal $$\begin{pmatrix}7 & 0 & 0 & 0\\ -1 & -1 & 0 & 0\\ 0 & 0 & 0 & 0\\ 0 & 0 & 0 & 0\end{pmatrix}$$

into four vectors: $(7, -1, 0, 0)^T$, $(0, -1, 0, 0)^T$, $(0, 0, 0, 0)^T$, and $(0, 0, 0, 0)^T$. The server records the vector $(7, -1, 0, 0)^T$ as A, records the vector $(0, -1, 0, 0)^T$ as B, and records the vector $(0, 0, 0, 0)^T$ as C. Therefore, the first signal $$\begin{pmatrix}7 & 0 & 0 & 0\\ -1 & -1 & 0 & 0\\ 0 & 0 & 0 & 0\\ 0 & 0 & 0 & 0\end{pmatrix}$$

can be simplified as (ABCC). In the first signal (ABCC), appearance probabilities of coding units "A", "B", and "C" in (ABCC) are respectively 0.25, 0.25, and 0.5, and the server generates an initial interval [0, 100000]. According to the appearance probabilities of the coding units "A", "B", and "C", the server divides the initial interval [0, 100000] into three sub-intervals: A: [0, 25000], B [25000, 50000], and C [50000,100000]. Since the first letter in the first signal (ABCC) is "A", the server selects the first sub-interval A: [0, 25000] as a basic interval for subsequent entropy coding. According to the appearance probabilities of the coding units "A", "B", and "C", the server divides the interval A: [0, 25000] into three sub-intervals: AA: [0, 6250], AB [6250, 12500], and AC [12500, 100000]. Since the second letter in the first signal (ABCC) is "B", the server selects the second sub-interval AB [6250, 12500] as a basic interval for subsequent entropy coding. According to the appearance probabilities of the coding units "A", "B", and "C", the server divides the interval AB [6250, 12500] into three sub-intervals: ABA: [6250, 7812.5], ABB [7812.5, 9375], and ABC [9375, 12500]. Since the third letter in the first signal (ABCC) is "C", the server selects the third sub-interval ABC [9375, 12500] as a basic interval for subsequent entropy coding. According to the appearance probabilities of the coding units "A", "B", and "C", the server divides the interval ABC [9375, 12500] into three sub-intervals: ABCA: [9375, 10156.25], ABCB [10156.25, 10, 937.5], and ABCC [10, 937.5, 12500], and therefore it is obtained that an interval for performing entropy coding on the first signal (ABCC) is ABCC [10, 937.5, 12500]. The server can use any value in the interval ABCC [10, 937.5, 12500] to represent the first signal (ABCC), for example, use 12000 to represent the first signal (ABCC).

When the entropy coding process of the first signal and the first parameter is simulated, and an obtained interval is [100, 130], the server can use any value in the interval [100, 130] to represent the analog audio stream, for example, use 120 to represent the analog audio stream.

Part 4: Explain the first target condition and the second target condition.

In a possible implementation, that the analog audio stream meets the first target condition means at least one of the following:

The bitrate of the analog audio stream is less than or equal to the target transcoding bitrate, or an audio stream quality parameter of the analog audio stream is greater than or equal to a quality parameter threshold. The audio stream parameter includes a signal-to-noise ratio, a perceptual evaluation of speech quality (PESO), a perceptual objective listening quality analysis (POLQA), and the like. The quality parameter threshold is set according to an actual condition, for example, the quality parameter threshold is set according to a requirement for voice call quality. That is, when the requirement for the voice call quality is relatively high, the quality parameter threshold can be set to be relatively high, and when the requirement for the voice call quality is relatively low, the quality parameter threshold can be set to be relatively small. This is not limited in the embodiments of this disclosure.

In a possible implementation, that at least one of the time-domain audio signal and the first signal, the target transcoding bitrate and the bitrate of the analog audio stream, or the quantity of completed iterations meets the second target condition means that:

a similarity between the time-domain audio signal and the first signal is greater than or equal to a similarity threshold; a difference between the target transcoding bitrate and the bitrate of the analog audio stream is less than or equal to a difference threshold; and the quantity of completed iterations is equal to a threshold of a quantity of iterations. That is, in the iteration process, the similarity between the time-domain audio signal and the first signal is used as the first factor that affects termination of the iteration, the difference between the target transcoding bitrate and the bitrate of the analog audio stream is used as the second factor that affects the termination of the iteration, and the quantity of completed iterations is used as the third factor that affects the termination of the iteration. The server can determine when to terminate the iteration through the three factors. In some embodiments, when the threshold of a quantity of iterations is 3 and a current quantity of iterations is 3, the similarity between the time-domain audio signal and the first signal obtained through iteration is less than the similarity threshold, and the difference between the target transcoding bitrate and the bitrate of the analog audio stream is greater than the difference threshold. Since the quantity of completed iterations is the same as the threshold of a quantity of iterations, the server can terminate the iteration and use a candidate quantization parameter corresponding to the current iteration as the first quantization parameter. With a limitation of the second target condition, the server can obtain the first quantization parameter with a fewer quantity of iterations, so that in a real-time voice call scenario, the transcoding can be completed at a faster speed.

Under the limitation of the foregoing second target condition, the server does not perform a complete iteration process. In some embodiments, the foregoing iteration process is also a noise shaping quantization (NSQ) loop iteration. The limitation of the foregoing second target condition may also be referred to as a greedy algorithm, and the speed of audio transcoding can be greatly improved by using the greedy algorithm. Reasons are as follows: First, the first audio stream is an optimal quantization result of a high bitrate, and therefore the server can search for another candidate quantization parameter near the quantization parameter of the first audio stream. Second, when the excitation signal is compared with the time-domain audio signal, the quantity of iterations can be greatly reduced according to the foregoing three factors. Certainly, in a more radical case, for example, only one iteration is performed, the decoder may also be deleted, and audio transcoding may be performed directly. This is not limited in the embodiments of this disclosure.

In addition, in the iteration process, the server uses the second candidate quantization parameter determined based on the target transcoding bitrate as an input of a next iteration process in response to the analog audio stream not meeting the first target condition, or the time-domain audio signal and the first signal, the target transcoding bitrate and the bitrate of the analog audio stream, and the quantity of completed iterations not meeting the second target condition. That is, when the threshold of a quantity of iterations is greater than 1, and neither the first target condition nor the second target condition is met, the server can re-determine the second candidate quantization parameter based on the target transcoding bitrate, and perform the next iteration process based on the second candidate quantization parameter.

404: The server re-quantizes the excitation signal and the audio feature parameter based on the time-domain audio signal and the first quantization parameter, to obtain the target excitation signal and the target audio feature parameter.

The target excitation signal is a re-quantized excitation signal, and the target audio feature parameter is a re-quantized audio feature parameter.

In a possible implementation, the server respectively performs discrete cosine transform on the excitation signal and the audio feature parameter, to obtain a third signal corresponding to the excitation signal and a third parameter corresponding to the audio feature parameter. The server performs rounding after respectively dividing the third signal and the third parameter by the first quantization parameter, to obtain the target excitation signal and the target audio feature parameter. This implementation and the part 2 in the foregoing step 403 belong to the same invention concept. For an implementation process, reference is made to the foregoing descriptions, and detains are not described herein again.

405. The server performs entropy coding on the target audio feature parameter and the target excitation signal, to obtain the second audio stream with the second bitrate, the second bitrate being lower than the first bitrate.

In a possible implementation, the server obtains the appearance probabilities of the plurality of coding units in the target audio feature parameter and the target excitation signal. The server codes the plurality of coding units based on the appearance probabilities, to obtain the second audio stream.

For example, to simplify the process, assuming that the target audio feature parameter and the target excitation signal are "DEFFG", each letter is a coding unit, where appearance probabilities of "D", "E", "F", and "G" in "DEFFG" are respectively 0.2, 0.2, 0.4, and 0.2, and an initial interval corresponding to "DEFFG" is [0, 100000]. According to the appearance probabilities of "D", "E", "F", and "G", the server divides the interval [0, 100000] into four sub-intervals: D: [0, 20000], E: [20000, 40000], F: [40000, 80000], and G: [80000, 100000]. A ratio between lengths of every two sub-intervals is the same as a ratio between corresponding appearance probabilities. Since the first letter in "DEFFG" is "D", the server selects the first sub-interval D: [0, 20000] as a basic interval for subsequent entropy coding. According to the appearance probabilities of "D", "E", "F", and "G", the server divides the interval D: [0, 20000] into four sub-intervals: DD: [0, 4000], DE: [4000, 8000], DF: [8000, 16000], and DG: [16000, 20000]. Since the first two letters in "DEFFG" are "DE", the server selects the second sub-interval DE: [4000, 8000] as a basic interval for subsequent entropy coding. According to the appearance probabilities of "D", "E", "F", and "G", the server divides the interval DE: [4000, 8000] into four sub-intervals: DED: [4000, 4800], DEE: [4800, 5600], DEF: [5600, 7200], and DEG: [7200, 8000]. Since the first three letters in "DEFFG" are "DEF", the server selects the third sub-interval DEF: [5600, 7200] as a basic interval for subsequent entropy coding. According to the appearance probabilities of "D", "E", "F", and "G", the server divides the interval DEF: [5600, 7200] into four sub-intervals: DEFD: [5600, 5920], DEFE: [5920, 6240], DEFF: [6240, 6880], and DEFG: [6880, 7200]. Since the first four letters in "DEFFG" are "DEFF", the server selects the third sub-interval DEFF: [6240, 6880] as a basic interval for subsequent entropy coding. According to the appearance probabilities of "D", "E", "F", and "G", the server divides the interval DEFF: [6240, 6880] into four sub-intervals: DEFFD: [6240, 6368], DEFFE: [6368, 6496], DEFFF: [6496, 6752], and DEFFG: [6752, 6880], and therefore it is obtained that an interval for performing entropy coding on "DEFFG" is [6752, 6880]. The server can use any value in the interval [6752, 6880] to represent a coding result of "DEFFG", for example, 6800 is used for representing "DEFFG". In the foregoing implementation, 6800 is also the second audio stream.

Optionally, after step 505, the audio transcoding method provided in the embodiments of this disclosure can also be combined with another audio processing method, to improve the quality of audio transcoding. For example, the audio transcoding method provided in the embodiments of this disclosure can be combined with a forward error correction (FEC) coding method. In an audio stream transmission process, a bit error and jilter may occur, resulting in degradation of quality of audio transmission. Based on this, a forward error correction method may be used to perform coding on audio. Essence of the forward error correction is to add redundant information into the audio, so that an error can be corrected in time when the bit error occurs. The redundant information is information related to first N frames of a current audio frame, where N is a positive integer.

In a possible implementation, the server performs forward error correction coding on a subsequently received audio stream based on the second audio stream.

For example, assuming that a segment of audio stream is an audio frame, the second audio stream is denoted as a T−1 frame, and an audio stream subsequently received from the terminal is denoted as a T frame. Then, when coding the T frame, the server can use the T−1 frame (that is, the second audio stream) as the redundant information in the forward error correction coding of the T frame and code the T−1 frame, to obtain a coded FEC bit stream, where T is a positive integer. Since a bitrate of the T−1 frame is reduced through the audio transcoding method provided in the embodiments of this disclosure, an overall bitrate of the coded FEC bit stream can also be reduced, thereby improving network antagonism during audio stream transmission on the premise of ensuring the audio quality. The network antagonism refers to the performance against the network fluctuation.

Figure 6:
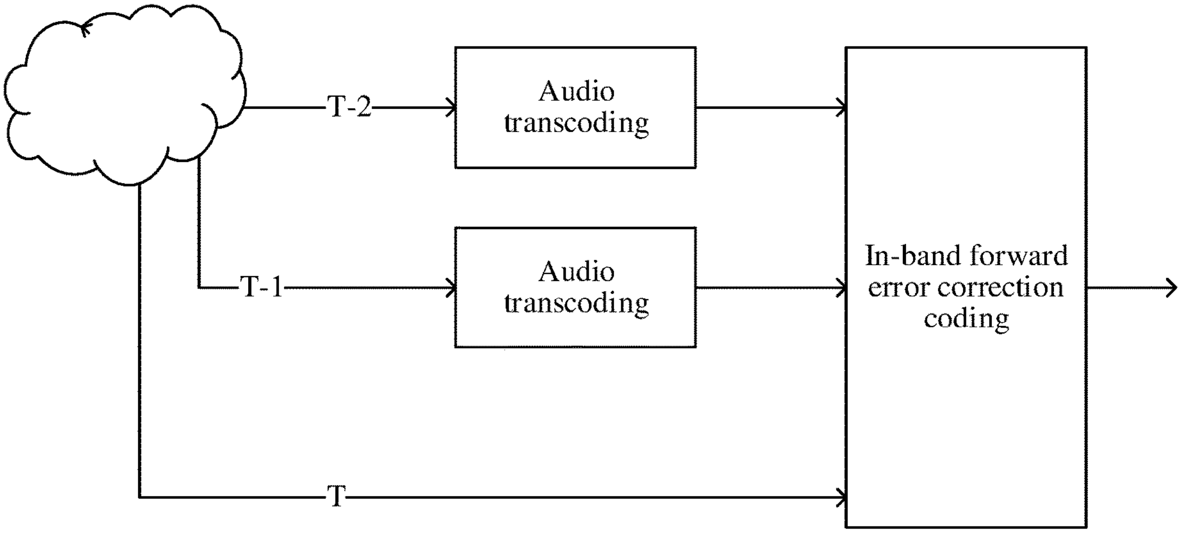
FIG. 6 is an example schematic structural diagram of an audio transcoder according to an embodiment of this disclosure.

The foregoing descriptions are made by taking an example in which an audio frame is used as the redundant information in the forward error correction coding. In another possible implementation, referring to FIG. 6, when the server currently codes a Tth frame, for a T−1 frame and a T−2 frame, the server can adjust bitrates of the T−1 frame and the T−2 frame by using the audio transcoding method provided in the embodiments of this disclosure, to reduce the bitrates of the T−1 frame and the T−2 frame. By using the forward error correction method, the adjusted T−1 frame and the T−2 frame, and the T frame are coded, to obtain the coded FEC bit stream. Since the bitrates of the T−1 frame and the T−2 frame are reduced, the overall bitrate of the coded FEC bit stream can also be reduced, thereby improving the network antagonism during audio stream transmission on the premise of ensuring the audio quality.

By using the technical solutions provided in the embodiments of this disclosure, when transcoding is performed on an audio stream, a complete parameter extraction process does not need to be performed, but instead, entropy decoding is performed to obtain the audio feature parameter and the excitation signal, that is, a more radical greedy algorithm is used. The re-quantization is performed for the excitation signal and the audio feature parameter, and does not involve related processing on the time-domain signal. Finally, entropy coding is performed on the excitation signal and the audio feature parameter, to obtain the second audio stream with a smaller bitrate. Since the complexity of entropy decoding and entropy coding is almost negligible, the computing amount of entropy decoding and entropy coding is relatively small, and the computing amount can also be greatly reduced without performing processing on the time-domain signal, thereby improving the speed and efficiency of audio transcoding as a whole on the premise of ensuring the audio quality.

Figure 7:
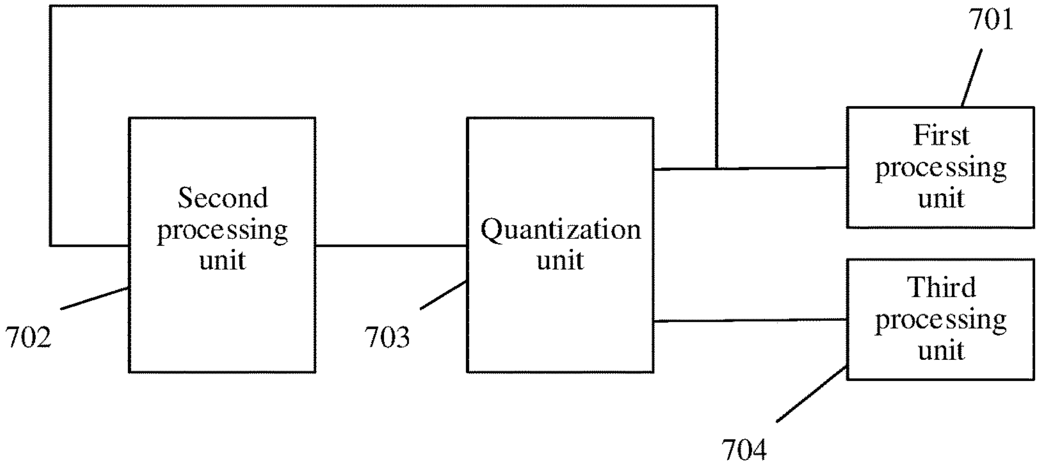
FIG. 7 is an example schematic diagram of a forward error correction coding method according to an embodiment of this disclosure.

In addition, an embodiment of this disclosure further provides an audio transcoder. For a structure of the audio transcoder, reference is made to FIG. 7. The audio transcoder includes: a first processing unit 701, a second processing unit 702, a quantization unit 703, and a third processing unit 704, the first processing unit 701 being respectively connected to the second processing unit 702 and the quantization unit 703, the second processing unit 702 being connected to the quantization unit 703, and the quantization unit 703 being connected to the third processing unit 704. In some embodiments, the audio transcoder provided in this embodiment of this disclosure is also referred to as a downlink transcoder.

The first processing unit 701 is configured to perform entropy decoding on a first audio stream with a first bitrate, to obtain an audio feature parameter and an excitation signal of the first audio stream, the excitation signal being a quantized audio signal.

The second processing unit 702 is configured to obtain a time-domain audio signal corresponding to the excitation signal based on the audio feature parameter and the excitation signal.

The quantization unit 703 is configured to re-quantize the excitation signal and the audio feature parameter based on the time-domain audio signal and the target transcoding bitrate, to obtain a target excitation signal and a target audio feature parameter. In some embodiments, the quantization unit 703 is also referred to as a quick noise shaping quantization unit.

The third processing unit 704 is configured to perform entropy coding on the target audio feature parameter and the target excitation signal, to obtain a second audio stream with a second bitrate, the second bitrate being lower than the first bitrate.

In some embodiments, during transcoding, the first processing unit 701 can respectively transmit the audio feature parameter and the excitation signal to the second processing unit 702 and the quantization unit 703, and the second processing unit 702 can obtain the audio feature parameter and the excitation signal from the first processing unit and obtain the time-domain audio signal corresponding to the excitation signal based on the audio feature parameter and the excitation signal. The second processing unit 702 can transmit the time-domain audio signal to the quantization unit 703. The quantization unit 703 can receive the target transcoding bitrate, the audio feature parameter, the excitation signal, and the time-domain audio signal, to re-quantize the excitation signal and the audio feature parameter. The quantization unit 703 can transmit the target audio feature parameter and the target excitation signal to the third processing unit 704, and the third processing unit 704 performs entropy coding on the target audio feature parameter and the target excitation signal, to obtain the second audio stream with the second bitrate.

In a possible implementation, the quantization unit 703 is configured to obtain a first quantization parameter through at least one iteration process based on the target transcoding bitrate, the first quantization parameter being used for adjusting the first bitrate of the first audio stream to the target transcoding bitrate. The excitation signal and the audio feature parameter are re-quantized based on the time-domain audio signal and the first quantization parameter, to obtain the target excitation signal and the target audio feature parameter.

In a possible implementation, the quantization unit 703 is configured to determine a first candidate quantization parameter based on the target transcoding bitrate in any iteration process. A re-quantization process of the excitation signal and the audio feature parameter is simulated based on the first candidate quantization parameter, to obtain a first signal corresponding to the excitation signal and a first parameter corresponding to the audio feature parameter. An entropy coding process of the first signal and the first parameter is simulated, to obtain an analog audio stream. The first candidate quantization parameter is determined as the first quantization parameter in response to the analog audio stream meeting a first target condition and at least one of the time-domain audio signal and the first signal, the target transcoding bitrate and a bitrate of the analog audio stream, or a quantity of completed iterations meeting a second target condition.

In a possible implementation, that the analog audio stream meets the first target condition means at least one of the following:

the bitrate of the analog audio stream is less than or equal to the target transcoding bitrate; or an audio stream quality parameter of the analog audio stream is greater than or equal to a quality parameter threshold.

In a possible implementation, that at least one of the time-domain audio signal and the first signal, the target transcoding bitrate and the bitrate of the analog audio stream, or the quantity of completed iterations meets the second target condition means that:

a similarity between the time-domain audio signal and the first signal is greater than or equal to a similarity threshold;

a difference between the target transcoding bitrate and the bitrate of the analog audio stream is less than or equal to a difference threshold; and a quantity of completed iterations is equal to a threshold of a quantity of iterations.

In a possible implementation, the quantization unit 703 is configured to:

respectively simulate a discrete cosine transform process of the excitation signal and a discrete cosine transform process of the audio feature parameter, to obtain a second signal corresponding to the excitation signal and a second parameter corresponding to the audio feature parameter; and perform rounding after the second signal and the second parameter are respectively divided by the first candidate quantization parameter, to obtain the first signal and the first parameter.

In a possible implementation, the quantization unit 703 is further configured to: use a second candidate quantization parameter determined based on the target transcoding bitrate as an input of a next iteration process in response to the analog audio stream not meeting the first target condition, or the time-domain audio signal and the first signal, the target transcoding bitrate and the bitrate of the analog audio stream, and the quantity of completed iterations not meeting the second target condition.

In a possible implementation, the first processing unit 701 is configured to: obtain appearance probabilities of a plurality of coding units in the first audio stream. The first audio stream is decoded based on the appearance probabilities, to obtain a plurality of decoding units respectively corresponding to the plurality of coding units. The plurality of decoding units are combined, to obtain the audio feature parameter and the excitation signal of the first audio stream.

In a possible implementation, the third processing unit 704 is configured to:

obtain appearance probabilities of a plurality of coding units in the target audio feature parameter and the target excitation signal; and code the plurality of coding units based on the appearance probabilities, to obtain the second audio stream.

In a possible implementation, the audio transcoder further includes a forward error correction unit. A forward error correction unit is connected to the third processing unit 704, and is configured to perform forward error correction coding on a subsequently received audio stream based on the second audio stream.

When the audio transcoder provided in the foregoing embodiment performs audio transcoding, division of the foregoing functional units is merely used as an example for description. In practical application, the foregoing functions may be assigned to and completed by different functional units according to requirements, that is, an internal structure of the audio transcoder is divided into different functional units, to implement all or some of the functions described above. In addition, the audio transcoder and the audio transcoding method embodiments provided in the foregoing embodiments belong to the same concept. For the specific implementation process, reference may be made to the method embodiments, and details are not described herein again.

By using the technical solutions provided in the embodiments of this disclosure, when transcoding is performed on an audio stream, a complete parameter extraction process does not need to be performed, but instead, entropy decoding is performed to obtain the audio feature parameter and the excitation signal. The re-quantization is performed for the excitation signal and the audio feature parameter, and does not involve related processing on the time-domain signal. Finally, entropy coding is performed on the excitation signal and the audio feature parameter, to obtain the second audio stream with a smaller bitrate. Since a computing amount of entropy decoding and entropy coding is relatively small, the computing amount can also be greatly reduced without performing processing on the time-domain signal, thereby improving a speed and efficiency of audio transcoding as a whole on the premise of ensuring sound quality.

Figure 8:
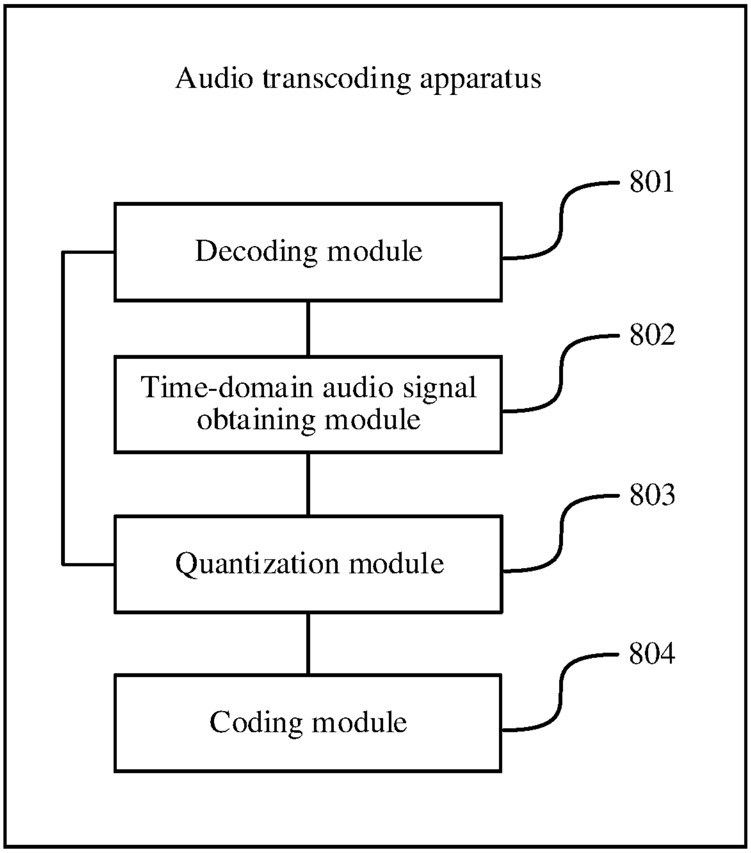
FIG. 8 is an example schematic structural diagram of an audio transcoding apparatus according to an embodiment of this disclosure.

FIG. 8 is a schematic structural diagram of an audio transcoding apparatus according to an embodiment of this disclosure. Referring to FIG. 8, the apparatus includes: a decoding module 801, a time-domain audio signal obtaining module 802, a quantization module 803, and a coding module 804.

The decoding module 801 is configured to perform entropy decoding on a first audio stream with a first bitrate, to obtain an audio feature parameter and an excitation signal of the first audio stream, the excitation signal being a quantized audio signal.

The time-domain audio signal obtaining module 802 is configured to obtain a time-domain audio signal corresponding to the excitation signal based on the audio feature parameter and the excitation signal.

The quantization module 803 is configured to re-quantize the excitation signal and the audio feature parameter based on the time-domain audio signal and the target transcoding bitrate, to obtain a target excitation signal and a target audio feature parameter.

The coding module 804 is configured to perform entropy coding on the target audio feature parameter and the target excitation signal, to obtain a second audio stream with a second bitrate, the second bitrate being lower than the first bitrate.

In a possible implementation, the quantization module is configured to obtain a first quantization parameter through at least one iteration process based on the target transcoding bitrate, the first quantization parameter being used for adjusting the first bitrate of the first audio stream to the target transcoding bitrate. The excitation signal and the audio feature parameter are re-quantized based on the time-domain audio signal and the first quantization parameter, to obtain the target excitation signal and the target audio feature parameter.

In a possible implementation, the quantization module is configured to determine a first candidate quantization parameter based on the target transcoding bitrate in any iteration process. A re-quantization process of the excitation signal and the audio feature parameter is simulated based on the first candidate quantization parameter, to obtain a first signal corresponding to the excitation signal and a first parameter corresponding to the audio feature parameter. An entropy coding process of the first signal and the first parameter is simulated, to obtain an analog audio stream. The first candidate quantization parameter is determined as the first quantization parameter in response to the analog audio stream meeting a first target condition and at least one of the time-domain audio signal and the first signal, the target transcoding bitrate and a bitrate of the analog audio stream, or a quantity of completed iterations meeting a second target condition.

In a possible implementation, that the analog audio stream meets the first target condition means at least one of the following:

- the bitrate of the analog audio stream is less than or equal to the target transcoding bitrate; or
- an audio stream quality parameter of the analog audio stream is greater than or equal to a quality parameter threshold.

In a possible implementation, that at least one of the time-domain audio signal and the first signal, the target transcoding bitrate and the bitrate of the analog audio stream, or the quantity of completed iterations meets the second target condition means that:

- a similarity between the time-domain audio signal and the first signal is greater than or equal to a similarity threshold;
- a difference between the target transcoding bitrate and the bitrate of the analog audio stream is less than or equal to a difference threshold; and
- a quantity of completed iterations is equal to a threshold of a quantity of iterations.

In a possible implementation, the quantization module is configured to: respectively simulate a discrete cosine transform process of the excitation signal and a discrete cosine transform process of the audio feature parameter, to obtain a second signal corresponding to the excitation signal and a second parameter corresponding to the audio feature parameter; and

- perform rounding after the second signal and the second parameter are respectively divided by the first candidate quantization parameter, to obtain the first signal and the first parameter.

In a possible implementation, the quantization module is further configured to use a second candidate quantization parameter determined based on the target transcoding bitrate as an input of a next iteration process in response to the analog audio stream not meeting the first target condition, or the time-domain audio signal and the first signal, the target transcoding bitrate and the bitrate of the analog audio stream, and the quantity of completed iterations not meeting the second target condition.

In a possible implementation, the decoding module is configured to obtain appearance probabilities of a plurality of coding units in the first audio stream. The first audio stream is decoded based on the appearance probabilities, to obtain a plurality of decoding units respectively corresponding to the plurality of coding units. The plurality of decoding units are combined, to obtain the audio feature parameter and the excitation signal of the first audio stream.

In a possible implementation, the coding module is configured to: obtain appearance probabilities of a plurality of coding units in the target audio feature parameter and the target excitation signal; and code the plurality of coding units based on the appearance probabilities, to obtain the second audio stream.

In a possible implementation, the apparatus further includes a forward error correction module, configured to perform forward error correction coding on a subsequently received audio stream based on the second audio stream.

When the audio transcoding apparatus provided in the foregoing embodiment performs audio transcoding, division of the foregoing functional modules is merely used as an example for description. In practical application, the foregoing functions may be assigned to and completed by different functional modules according to requirements, that is, an internal structure of the audio transcoding apparatus is divided into different functional units, to implement all or some of the functions described above. In addition, the audio transcoding apparatus and the audio transcoding method embodiments provided in the foregoing embodiments belong to the same concept. For the specific implementation process, reference may be made to the method embodiments, and details are not described herein again.

By using the technical solutions provided in the embodiments of this disclosure, when transcoding is performed on an audio stream, a complete parameter extraction process does not need to be performed, but instead, entropy decoding is performed to obtain the audio feature parameter and the excitation signal. The re-quantization is performed for the excitation signal and the audio feature parameter, and does not involve related processing on the time-domain signal. Finally, entropy coding is performed on the excitation signal and the audio feature parameter, to obtain the second audio stream with a smaller bitrate. Since a computing amount of entropy decoding and entropy coding is relatively small, the computing amount can also be greatly reduced without performing processing on the time-domain signal, thereby improving a speed and efficiency of audio transcoding as a whole on the premise of ensuring sound quality.

In the disclosure above, a unit or a module may be hardware such as a combination of electronic circuitries, firmware, or software such as computer instructions. The unit and the module may also be any combination of hardware, firmware, and software. In some implementation, a unit may include at least one module.

An embodiment of this disclosure provides a computer device, configured to perform the foregoing method, the computer device may be implemented as a terminal or a server, and a structure of the terminal is first described below.

Figure 9:
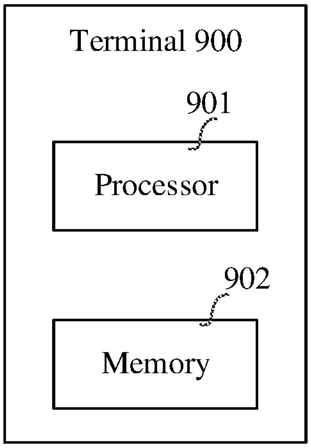
FIG. 9 is an example schematic structural diagram of a terminal according to an embodiment of this disclosure.

FIG. 9 is a schematic structural diagram of a terminal according to an embodiment of this disclosure. The terminal 900 may be a smartphone, a tablet computer, a notebook computer or a desktop computer. The terminal 900 may also be referred to as a user equipment, a portable terminal, a laptop terminal, a desktop terminal or the like.

Generally, the terminal 900 includes one or more processors 901 and one or more memories 902.

The processor 901 may include one or more processing cores such as a 4-core processor or an 8-core processor. The processor 901 may be implemented in at least one hardware form of a digital signal processor (DSP), a field-programmable gate array (FPGA), and a programmable logic array (PLA). The processor 901 may also include a main processor and a coprocessor. The main processor is a processor configured to process data in an awake state, and is also referred to as a central processing unit (CPU). The coprocessor is a low power consumption processor configured to process data in a standby state.

The memory 902 may include one or more computer-readable storage media. The computer-readable storage media may be non-transitory. The memory 902 may further include a high-speed random access memory and a non-volatile memory, such as one or more magnetic disk storage devices or a flash storage device. In some embodiments, the non-transient computer-readable storage medium in the memory 902 is configured to store at least one computer program, and the at least one computer program is configured to be executed by the processor 901 to implement the audio transcoding method provided in the method embodiments of this disclosure.

A person skilled in the art may understand that a structure shown in FIG. 9 constitutes no limitation on the terminal 900, and the terminal may include more or fewer components than those shown in the figure, or combine some components, or use a different component deployment.

The foregoing computer device may alternatively be implemented as a server, and a structure of the server is described below.

Figure 10:
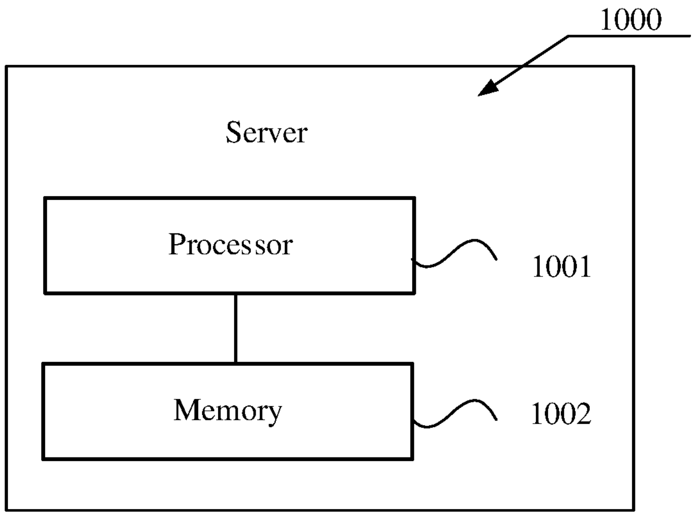
FIG. 10 is an example schematic structural diagram of a server according to an embodiment of this disclosure.

FIG. 10 is a schematic structural diagram of a server according to an embodiment of this disclosure. The server 1000 may vary greatly due to different configurations or performance, and may include one or more central processing units (CPUs) 1001 and one or more memories 1002. The one or more memories 1002 store at least one computer program, the at least one computer program being loaded and executed by the one or more processors 1001 to implement the methods provided in the foregoing method embodiments. Certainly, the server 1000 may also have a wired or wireless network interface, a keyboard, an input/output interface and other components to facilitate input/output. The server 1000 may also include other components for implementing device functions. Details are not described herein.

In an exemplary embodiment, a computer-readable storage medium, such as a memory including a computer program, is further provided, and the computer program may be executed by a processor to complete the audio transcoding method in the foregoing embodiments. For example, the computer-readable storage medium may be a read-only memory (ROM), a random access memory (random-access memory, RAM), a compact disc read-only memory (CD-ROM), a magnetic tape, a floppy disk, an optical data storage device, and the like.

In an exemplary embodiment, a computer program product or a computer program is further provided, including a program code, the program code being stored in a computer-readable storage medium, a processor of a computer device reading the program code from the computer-readable storage medium, and the processor executing the program code, to cause the computer device to implement the foregoing audio transcoding method.

The foregoing descriptions are merely optional embodiments of this disclosure, but are not intended to limit this disclosure. Any modification, equivalent replacement, or improvement made within the spirit and principle of this disclosure shall fall within the protection scope of this disclosure.

What is claimed is:

1. An audio transcoding method, performed by a computer device, the method comprising:

performing entropy decoding on a first audio stream with a first bitrate, to obtain an audio feature parameter and an excitation signal of the first audio stream without a complete parameter extraction process, the excitation signal being a quantized audio signal;

obtaining a time-domain audio signal corresponding to the excitation signal based on the audio feature parameter and the excitation signal;

determining a first candidate quantization parameter based on a target transcoding bitrate through at least one iteration process;

simulating a re-quantization process of the excitation signal and the audio feature parameter based on the first candidate quantization parameter to obtain a first signal corresponding to the excitation signal and a first parameter corresponding to the audio feature parameter, wherein simulating the re-quantization process comprises:

respectively simulating a discrete cosine transform process of the excitation signal and a discrete cosine transform process of the audio feature parameter, to obtain a second signal corresponding to the excitation signal and a second parameter corresponding to the audio feature parameter; and performing rounding after the second signal and the second parameter are respectively divided by the first candidate quantization parameter;

simulating an entropy coding process of the first signal and the first parameter, to obtain an analog audio stream;

identifying the first candidate quantization parameter as a first quantization parameter only in response to the analog audio stream meeting a first target condition and at least one of the time-domain audio signal and a first signal as an intermediate output of the simulation process, the target transcoding bitrate and a bitrate of the analog audio stream, or a number of completed iterations meeting a second target condition, the first quantization parameter being used for adjusting the first bitrate of the first audio stream to the target transcoding bitrate;

re-quantizing the excitation signal and the audio feature parameter based on the time-domain audio signal and the first quantization parameter, to obtain a target excitation signal and a target audio feature parameter; and performing entropy coding only on the target audio feature parameter and the target excitation signal, to obtain a second audio stream with a second bitrate, the second bitrate being lower than the first bitrate.

2. The method according to claim 1, wherein analog audio stream meeting the first target condition comprises:

the bitrate of the analog audio stream is less than or equal to the target transcoding bitrate; or an audio stream quality parameter of the analog audio stream is greater than or equal to a quality parameter threshold.

3. The method according to claim 1, wherein at least one of the time-domain audio signal and the first signal, the target transcoding bitrate and the bitrate of the analog audio stream, or the number of completed iterations meets the second target condition comprises:

a similarity between the time-domain audio signal and the first signal is greater than or equal to a similarity threshold;

a difference between the target transcoding bitrate and the bitrate of the analog audio stream is less than or equal to a difference threshold; and the number of completed iterations is equal to a threshold number.

4. The method according to claim 1, further comprising:

using a second candidate quantization parameter determined based on the target transcoding bitrate as an input of a next iteration process in response to the analog audio stream not meeting the first target condition, or the time-domain audio signal and the first signal, the target transcoding bitrate and the bitrate of the analog audio stream, and the number of completed iterations not meeting the second target condition.

5. The method according to claim 1, wherein performing entropy decoding on the first audio stream with the first bitrate, to obtain the audio feature parameter and the excitation signal of the first audio stream comprises:

obtaining appearance probabilities of a plurality of coding units in the first audio stream;

decoding the first audio stream based on the appearance probabilities, to obtain a plurality of decoding units respectively corresponding to the plurality of coding units; and combining the plurality of decoding units, to obtain the audio feature parameter and the excitation signal of the first audio stream.

6. The method according to claim 1, wherein performing entropy coding on the target audio feature parameter and the target excitation signal, to obtain the second audio stream with the second bitrate comprises:

obtaining appearance probabilities of a plurality of coding units in the target audio feature parameter and the target excitation signal; and coding the plurality of coding units based on the appearance probabilities, to obtain the second audio stream.

7. The method according to claim 1, further comprising:

performing forward error correction coding on a subsequently received audio stream based on the second audio stream.

8. An audio transcoder, comprising a memory for storing instructions and a processor for executing the instructions to:

perform entropy decoding on a first audio stream with a first bitrate, to obtain an audio feature parameter and an excitation signal of the first audio stream without a complete parameter extraction process, the excitation signal being a quantized audio signal;

obtain a time-domain audio signal corresponding to the excitation signal based on the audio feature parameter and the excitation signal;

determine a first candidate quantization parameter based on a target transcoding bitrate through at least one iteration process;

simulate a re-quantization process of the excitation signal and the audio feature parameter based on the first candidate quantization parameter to obtain a first signal corresponding to the excitation signal and a first parameter corresponding to the audio feature parameter, wherein the processor is configured to simulate the re-quantization process by:

respectively simulating a discrete cosine transform process of the excitation signal and a discrete cosine transform process of the audio feature parameter, to obtain a second signal corresponding to the excitation signal and a second parameter corresponding to the audio feature parameter; and performing rounding after the second signal and the second parameter are respectively divided by the first candidate quantization parameter;

simulate an entropy coding process of the first signal and the first parameter, to obtain an analog audio stream;

identify the first candidate quantization parameter as a first quantization parameter only in response to the analog audio stream meeting a first target condition and at least one of the time-domain audio signal and a first signal as an intermediate output of the simulation process, the target transcoding bitrate and a bitrate of the analog audio stream, or a number of completed iterations meeting a second target condition, the first quantization parameter being used for adjusting the first bitrate of the first audio stream to the target transcoding bitrate;

re-quantize the excitation signal and the audio feature parameter based on the time-domain audio signal and the first quantization parameter, to obtain a target excitation signal and a target audio feature parameter; and perform entropy coding only on the target audio feature parameter and the target excitation signal, to obtain a second audio stream with a second bitrate, the second bitrate being lower than the first bitrate.

9. The audio transcoder of claim 8, wherein the analog audio stream meeting the first target condition comprises:

the bitrate of the analog audio stream is less than or equal to the target transcoding bitrate; or an audio stream quality parameter of the analog audio stream is greater than or equal to a quality parameter threshold.

10. The audio transcoder of claim 8, wherein at least one of the time-domain audio signal and the first signal, the target transcoding bitrate and the bitrate of the analog audio stream, or the number of completed iterations meets the second target condition comprises:

a similarity between the time-domain audio signal and the first signal is greater than or equal to a similarity threshold;

a difference between the target transcoding bitrate and the bitrate of the analog audio stream is less than or equal to a difference threshold; and the number of completed iterations is equal to a threshold number.

11. The audio transcoder of claim 8, wherein the processor is further configured to execute the instructions to:

use a second candidate quantization parameter determined based on the target transcoding bitrate as an input of a next iteration process in response to the analog audio stream not meeting the first target condition, or the time-domain audio signal and the first signal, the target transcoding bitrate and the bitrate of the analog audio stream, and the number of completed iterations not meeting the second target condition.

12. The audio transcoder of claim 8, wherein to perform entropy decoding on the first audio stream with the first bitrate, to obtain the audio feature parameter and the excitation signal of the first audio stream comprises:

obtaining appearance probabilities of a plurality of coding units in the first audio stream;

decoding the first audio stream based on the appearance probabilities, to obtain a plurality of decoding units respectively corresponding to the plurality of coding units; and combining the plurality of decoding units, to obtain the audio feature parameter and the excitation signal of the first audio stream.

13. The audio transcoder of claim 8, wherein to perform entropy coding on the target audio feature parameter and the target excitation signal, to obtain the second audio stream with the second bitrate comprises:

obtaining appearance probabilities of a plurality of coding units in the target audio feature parameter and the target excitation signal; and coding the plurality of coding units based on the appearance probabilities, to obtain the second audio stream.

14. A non-transitory computer readable medium for storing computer instructions, the computer instructions when executed by an audio transcoding apparatus, cause the audio transcoding apparatus to:

perform entropy decoding on a first audio stream with a first bitrate, to obtain an audio feature parameter and an excitation signal of the first audio stream without a complete parameter extraction, the excitation signal being a quantized audio signal;

obtain a time-domain audio signal corresponding to the excitation signal based on the audio feature parameter and the excitation signal;

determine a first candidate quantization parameter based on a target transcoding bitrate through at least one iteration process;

simulate a re-quantization process of the excitation signal and the audio feature parameter based on the first candidate quantization parameter to obtain a first signal corresponding to the excitation signal and a first parameter corresponding to the audio feature parameter, wherein the computer instructions, when executed by the audio transcoding apparatus, cause the computer device to simulate the re-quantization process by:

respectively simulating a discrete cosine transform process of the excitation signal and a discrete cosine transform process of the audio feature parameter, to obtain a second signal corresponding to the excitation signal and a second parameter corresponding to the audio feature parameter; and performing rounding after the second signal and the second parameter are respectively divided by the first candidate quantization parameter;

simulate an entropy coding process of the first signal and the first parameter, to obtain an analog audio stream;

identify the first candidate quantization parameter as a first quantization parameter only in response to the analog audio stream meeting a first target condition and at least one of the time-domain audio signal and a first signal as an intermediate output of the simulation process, the target transcoding bitrate and a bitrate of the analog audio stream, or a number of completed iterations meeting a second target condition, the first quantization parameter being used for adjusting the first bitrate of the first audio stream to the target transcoding bitrate;

re-quantize the excitation signal and the audio feature parameter based on the time-domain audio signal and the first quantization parameter, to obtain a target excitation signal and a target audio feature parameter; and perform entropy coding only on the target audio feature parameter and the target excitation signal, to obtain a second audio stream with a second bitrate, the second bitrate being lower than the first bitrate.

* * * * *